April 16, 1935.    K. P. MALM ET AL    1,998,052
INSULATOR SUPPORT
Filed Sept. 16, 1931

Inventors:
KNUTE P. MALM, GEORGE WILLIAM BLACK
and WILLIAM OSCAR HENRICKSON.
by Msina & Rauber
their Attorneys.

Patented Apr. 16, 1935

1,998,052

UNITED STATES PATENT OFFICE 1,998,052

INSULATOR SUPPORT

Knute P. Malm and George William Black, Clairton, and William Oscar Henrickson, Homestead, Pa.

Application September 16, 1931, Serial No. 563,178

3 Claims. (Cl. 191—32)

This invention relates to insulator supports or hanger brackets for electrical conductors and is particularly adapted for supporting collector rails or bars in electric railway, tramway, crane and like installations.

The present invention has in view the provision of a hanger bracket or support of the class specified which is simple in construction, may be readily installed, is comprised of parts which are easily assembled and interchangeable, is readily adjusted without danger of electrical shock, and which at the same time serves as a reliable support for a collector rail or bar.

The hanger bracket of this invention is especially adapted for installations with severe operating conditions where moisture, acid vapors, dust, heat and smoke cause grounding, breakage or misalinement with consequent interference with operation.

Numerous other advantageous features will become apparent in view of the subsequent description, taken in connection with the drawing, wherein Figure 1 is a view in section and side elevation of a support or hanger bracket embodying the features of the invention;

Figure 1:
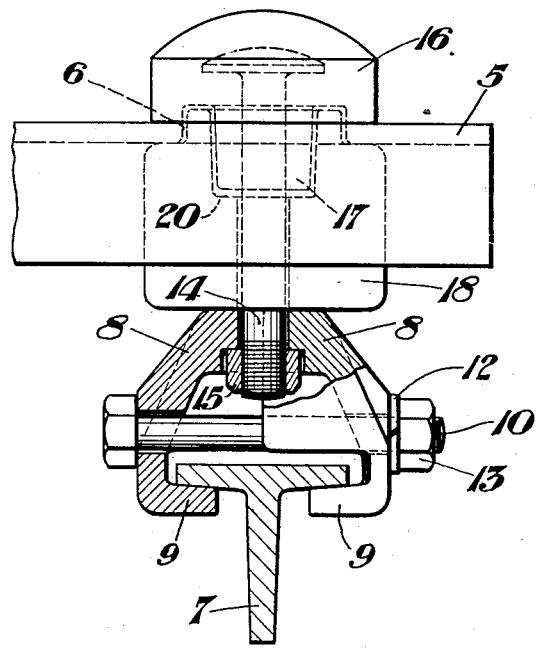
Figure 2:
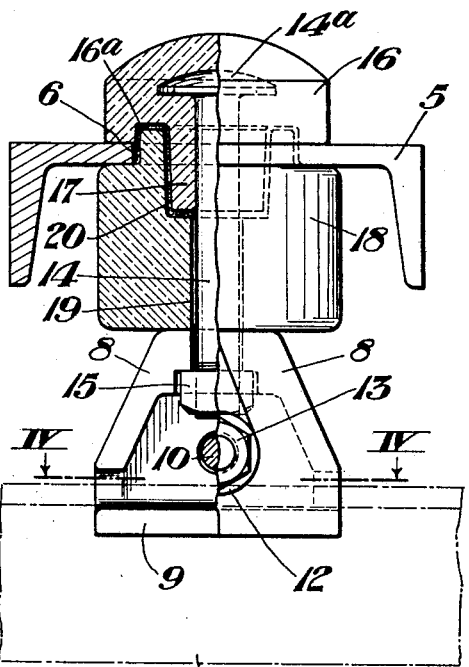
Figure 2 is a similar view looking from the opposite side of the support.
Figure 3:
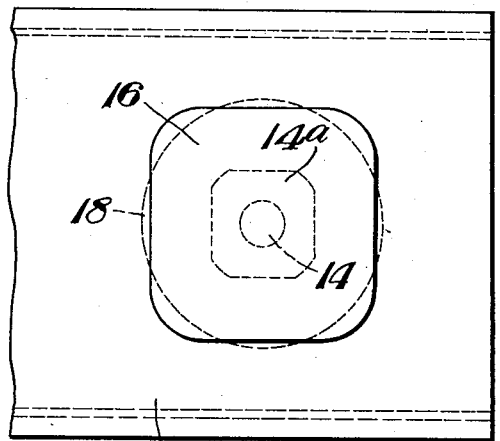
Figure 3 is a top plan of the support or hanger bracket.
Figure 4:
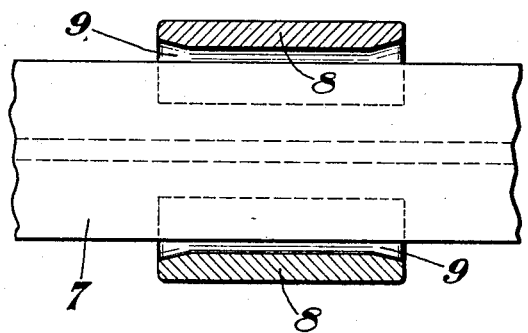
Figure 4 is a detail view of one of the parts.

The reference numeral 5 designates a main support or bracket which is here shown as of inverted channel shape and formed with openings 6 at points where it is desired to install one of the improved hanger brackets.

A collector rail of the T-type is indicated at 7 in a horizontally disposed position and supported by the herein described hanger bracket assembly.

The hanger bracket assembly comprises a pair of cooperating hanger sections 8 which form the hanger proper, said sections being formed with lower inwardly turned flanges or lugs 9 which are adapted to support the collector rail 7. The hanger sections 8 may be made of cast or malleable iron or any desired material, as found convenient, the two halves being held together in clamped relation by a bolt 10, lock washer 12 and nut 13.

The hanger sections 8 are suspended from the main support or bracket 5 by means of a hanger bolt 14 having a nut 15 applied on its lower extremity, said nut fitting into a recessed portion formed in the said hanger sections.

The upper end of the bolt 14 is provided with a squared head 14ª and embedded in a squared block 16 of insulating material, said block being formed with a boss or male projection 17 adapted to extend into recess 20 in a block 18 of insulating material. The block 16 is provided with a groove 16ª surrounding the projection 17 and adapted to receive a circular projection 20ª surrounding the recess 20 of the block 18.

The second block 18 is provided with an oversize bore 19 through which the bolt 14 extends.

The groove 16ª and recess 20 will be supplied with a quantity of plastic insulating compound prior to assembling the hanger bracket assembly so that when the parts are assembled the joint between the blocks 16 and 18 will be effectively sealed by a body 25 of the compound.

The channel 5 serves to prevent the accumulation of dirt and moisture on the lower block 18 and lessens the liability of the parts becoming grounded.

In mounting the improved hanger bracket or support, the hanger sections 8 may be applied on each side of the collector rail 7 and around the bolt 14 and clamped together, the grip exerted thereby being loose to permit expansion and contraction of the bar. The hanger bracket assembly may be easily tightened on the channel bracket 5 by simply grasping and turning the squared insulator block 16, as will be obvious from the drawing. The duplicate sections or halves 8 which form the hanger proper are interchangeable and easily installed and adjusted.

The parts of the entire assembly may be readily made from stock material and parts kept in stock and renewed as found necessary and desirable. The block 16 being made of insulating material, this operation may be performed without danger of shock by the electric current.

We claim:

1. A hanger bracket assembly comprising a main recessed supporting bracket provided with depending flanges, an insulating block adapted to rest on said bracket and formed with a projection depending into said recess and with a groove surrounding said projection, another insulating block positioned below said bracket and formed with a recess adapted to receive said projection and with a circular projection adapted to extend up through said bracket and into said groove of said first named block, means forming a sealing connection between said blocks, a hanger bolt having one extremity embedded in said first named block and its opposite extremity loosely passed through said second named block and having a nut threaded thereon, and a split hanger suspended from said bolt, said hanger being formed with a recessed portion adapted to receive said nut.

2. An insulated support for collector rails, comprising a bracket of an inverted channel type and providing depending flanges, an opening in the web of said bracket, a headed bolt extending through said opening, an insulated cover for the head of said bolt, said insulated cover being adapted to rest on said bracket, a projection on said cover extending through the opening in said bracket and an annular groove at the base of said projection, an insulating block having an enlarged opening through which said bolt extends, an annular ring on said block adapted to fit within the groove in said cover, clamping means associated with the end of said bolt for supporting a collector rail and insulating waterproofing material disposed between the adjoining surfaces of said cover and said insulating block.

3. An insulated support for collector rails, comprising a bracket of an inverted channel type and providing depending flanges, an opening in the web of said bracket, a headed bolt extending through said opening, an insulated cover for the head of said bolt, said insulated cover being adapted to rest on said bracket, a projection on said cover extending through the opening in said bracket and an annular groove at the base of said projection, an insulating block having an enlarged opening through which said bolt extends, an annular ring on said block adapted to fit within the groove in said cover, clamping means associated with the end of said bolt for supporting a collector rail and providing a clearance space between the clamping means and said rail to allow for expansion and contraction of the latter.

KNUTE P. MALM.
GEORGE W. BLACK.
WILLIAM O. HENRICKSON.